United States Patent [19]

Gower

[11] Patent Number: 4,768,822

[45] Date of Patent: Sep. 6, 1988

[54] TRUCK BED LINER RETAINER

[75] Inventor: Jerald Gower, Beaverton, Mich.

[73] Assignee: Durakon Industries, Inc., Lapeer, Mich.

[21] Appl. No.: 37,370

[22] Filed: Apr. 13, 1987

Related U.S. Application Data

[62] Division of Ser. No. 776,343, Sep. 16, 1985, Pat. No. 4,659,133.

[51] Int. Cl.$^4$ .............................................. B60D 33/02
[52] U.S. Cl. ................................ 296/39 R; 248/231.9; 403/375
[58] Field of Search ..................... 296/39 R; 248/27.1, 248/231.9; 410/77; 403/345, 375; 411/508, 907, 908

[56] References Cited

U.S. PATENT DOCUMENTS

| | | | |
|---|---|---|---|
| 1,536,906 | 5/1925 | Miller | 248/27.1 |
| 2,911,253 | 11/1959 | Dewey | 296/39 R |
| 4,047,749 | 9/1977 | Lambitz et al. | 296/39 R |
| 4,181,349 | 1/1980 | Nix et al. | 296/39 R |
| 4,333,678 | 6/1982 | Munoz et al. | 296/39 R |
| 4,561,615 | 12/1985 | Medlin, Jr. | 248/27.1 |
| 4,588,627 | 5/1986 | Isaksen et al. | 296/39 R |
| 4,623,187 | 11/1986 | Ibrahim | 296/39 R |

FOREIGN PATENT DOCUMENTS 694401  7/1953  United Kingdom ............... 411/508

Primary Examiner—Robert B. Reeves
Assistant Examiner—Joseph D. Pape
Attorney, Agent, or Firm—Cullen, Sloman, Cantor, Grauer, Scott & Rutherford

[57] ABSTRACT

A retainer for securing a flangeless cargo liner within a truck bed compartment such that the top rail of the truck bed compartment is unobstructed. In a first embodiment, the retainer includes a cup-shaped insertable portion having an outwardly extending rim around the periphery of its open end. A series of adjustment openings are located on one of the sides of the insertable portion for receiving a fastener. The retainer is inserted through an aperture in one of the liner walls and the fastener is inserted into one of the adjustment openings for engagement against a ledge wall of the truck bed compartment. In a modified form, the insertable portion of the retainer is generally triangular in cross-section to permit easier access between the installation tool and fastener. In another modified form, the retainer is J-shaped and includes an adhesive material which is brought into engagement with the ledge wall of the truck bed compartment for securing the retainer and attached liner side wall to the truck bed compartment. In still a further modified form, the retainer is rotatable having a rim portion for engaging the liner and a conical shaped insertable member that is spiraled in cross-section. The insertable member engages the ledge wall of the truck bed compartment in a screw-like manner to pull the rim against the liner and wedge the insertable portion against the ledge. A release means is provided on the insertable member to prevent overtightening.

1 Claim, 4 Drawing Sheets

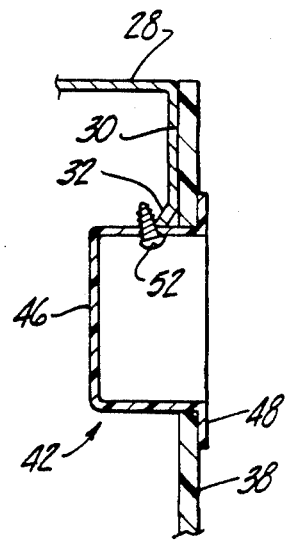
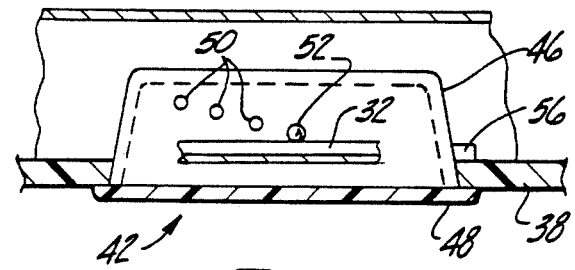
Fig-3
Fig-4
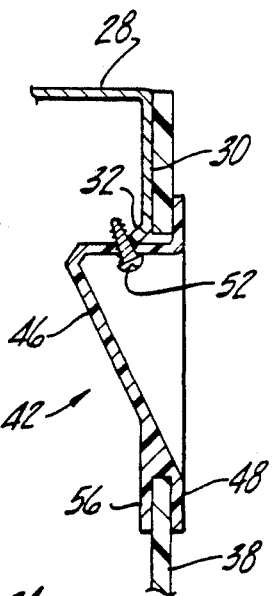
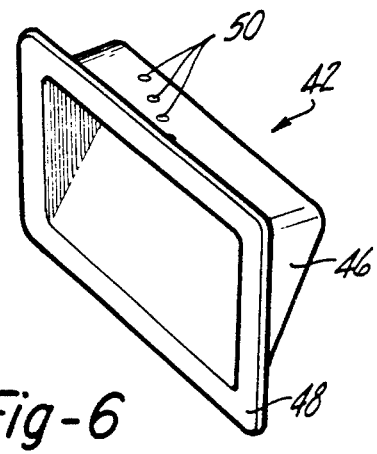
Fig-5
Fig-6
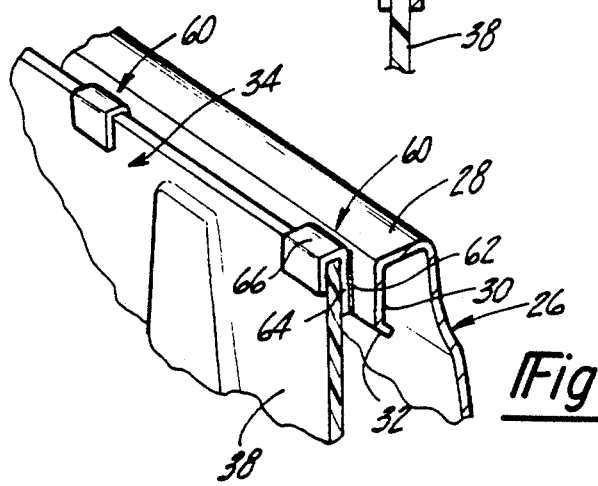
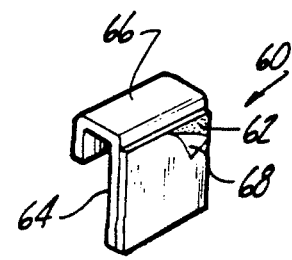
Fig-7
Fig-8

TRUCK BED LINER RETAINER

This is a division of application Ser. No. 776,343 filed Sept. 16, 1985 now U.S. Pat. No. 4,659,133.

BACKGROUND OF THE INVENTION

The present invention relates to molded plastic liners for truck cargo beds and, more particularly, to retainers for securing a cargo liner within a truck bed compartment.

Various truck bed liners have been disclosed in prior art patents including U.S. Pat. Nos. 4,047,749 to Lambitz et al and 4,341,412 to Wayne. Both of these patents show cargo liners having a flange about their upper end which covers the top rail of the truck bed compartment. It is conventional to secure this liner flange to the top rail of the truck bed compartment with fasteners. When it is desired to attach a camper top or cover to the top rail of the truck bed compartment, the liner flange may interfere with or prevent such attachment.

Thus, the present invention relates to a molded plastic liner that does not include a top ledge portion and to retainer means for securing such liner within a truck bed compartment. It is, therefore, an object of the present invention to provide a cargo liner which permits a camper top or a cover to be attached to the top rail of the truck bed compartment without interference or obstruction from a liner flange. Further, it is an object of the present invention to provide a retainer means which permits easy attachment and detachment of the flangeless liner to the truck bed compartment.

SUMMARY OF THE INVENTION

According to the present invention, a flangeless cargo liner is inserted into a truck bed compartment with the side and front walls of the liner abutting against the truck bed ledge walls and being held in abutting relationship thereto by the retaining means of the present invention. A plurality of liner retaining means made in accordance with the present invention are inserted into corresponding apertures formed in the liner side and front walls.

In a first embodiment, each liner retaining means includes a cup-shaped insertable portion having a rim around the periphery of its open end. The cup-shaped insertable portion has four sides connected by a bottom wall to form a box-like structure with a closed end and an open end. A series of adjustment openings are located on one of the sides of the insertable portion for receiving a fastener. Further, an alignment channel is formed along one side of the retaining means to aid in the attaching process.

To secure the cargo liner within the truck bed compartment, each retaining means is inserted into a corresponding aperture in the liner with the alignment channel on the retaining means being used to align the insertable portion of the retaining means and to hold the retaining means in the aperture until the fastener can be secured. After the retaining means is in place within the liner aperture, the fastener is inserted into one of the adjustment openings for engagement against a lip which extends downwardly from the truck bed compartment top rail. In this manner, the cargo liner is quickly and conveniently secured within the truck bed compartment without the need for drilling holes in the truck bed or otherwise disturbing its integrity.

The insertable portion of the retaining means may be modified such that it is generally triangular in cross-section. This permits easier access between the installation tool and fastener during the installation procedure. Further, another embodiment of the retaining means includes a J-shaped clip having adhesive material on its long leg with the short leg of the retainer being clipped onto the upper edge of the liner side wall. The adhesive material is brought into contact with the upper edge of the truck bed compartment for securing the J-shaped retainer clip and attached liner side wall to the truck bed compartment.

A still further embodiment of the retaining means is a plug having a cone shaped insertable portion that is spiraled in cross-section and interacts with the lip of the truck bed in a screw-like manner. The plug is inserted in a circular opening in the liner side wall and includes a rim that engages the protective liner at the opening. Rotation of the plug through approximately 180° tightly pulls the rim against the protective liner and wedges the insertable portion against the lip. Screws may then be used between the rim and liner to prevent loosening of the plug.

Other advantages and meritorious features of the present invention will be more fully understood from the following description of the invention, the appended claims, and the drawings, a brief description of which follows.

BRIEF DESCRIPTION OF DRAWINGS

FIG. 3 is a cross-sectional view taken along line 3—3 in FIG. 1.

FIG. 4 is a view, partly in cross-section, taken along line 4—4 in FIG. 1.

FIG. 5 is a cross-sectional view similar to FIG. 3 but showing a triangular configuration for the insertable portion of the retaining means.

FIG. 6 is a perspective view of the retaining means shown in FIG. 5.

FIG. 7 is a partial perspective view of the liner attached to the truck bed compartment by the J-shaped retaining means.

FIG. 8 is a perspective view of the J-shaped retaining means.

DETAILED DESCRIPTION OF THE INVENTION

Figure 1:
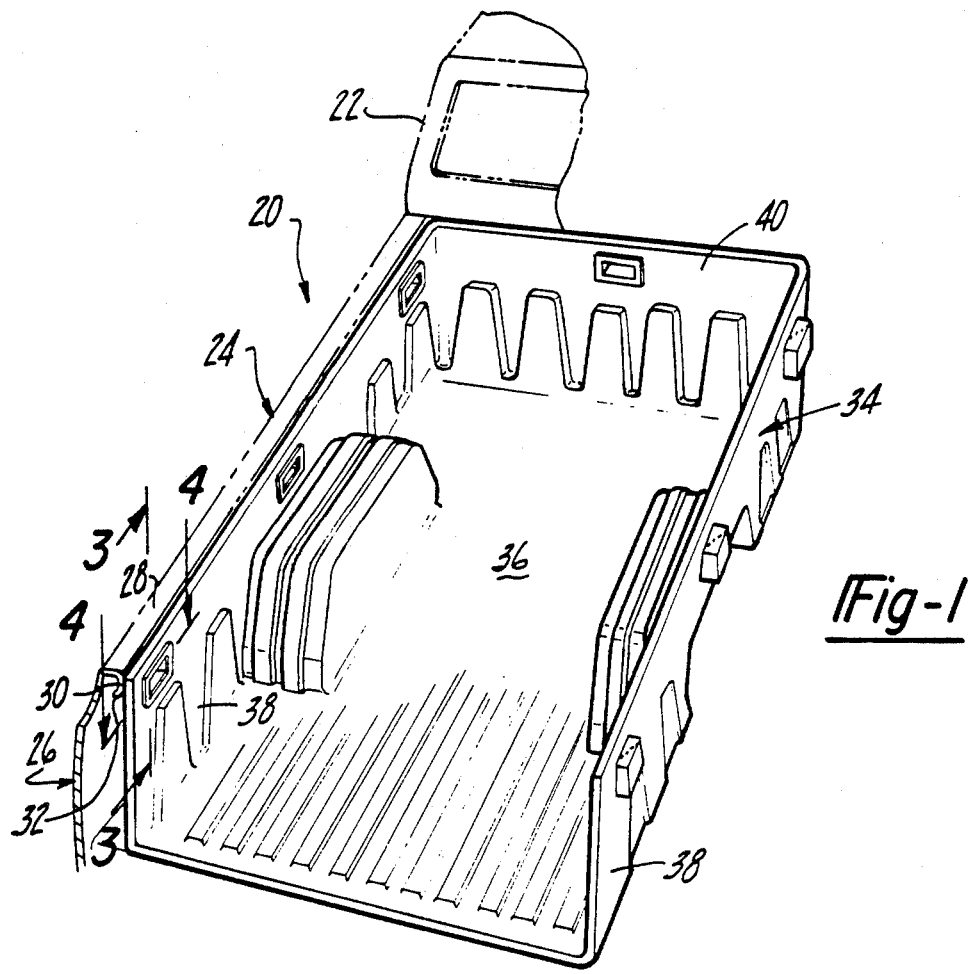
FIG. 1 is a fragmentary perspective view of a pick-up truck illustrating the cargo liner and retaining means of the present invention.

Referring now to the drawings, FIG. 1 illustrates a conventional pick-up truck 20 having a cab 22 and a truck bed or cargo compartment 24. Truck bed 24 includes side and front walls 26 with each wall having a top rail 28, a downwardly extending ledge wall 30, and a lip 32.

A cargo liner 34 of generally uniform thickness is inserted within the truck bed compartment 24. The cargo liner 34 has a base portion 36, opposed side walls 38, and a front wall 40. The cargo liner 34 does not have a top flange which prior liners have had for covering the top rail 28 of the truck bed compartment 24. Instead, liner 34 is flangeless whereby the side and front walls 38 and 40 of liner 34 abut against the truck bed ledge walls 30 and are held in abutting relationship thereto by the retaining means of the present invention, as will now be described.

Figure 2:
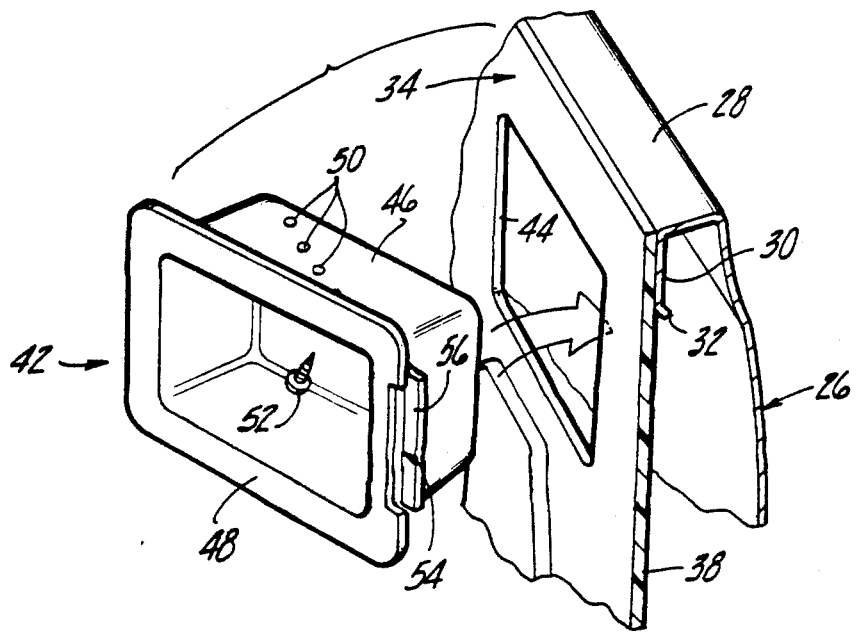
FIG. 2 is a fragmentary perspective assembly view of one embodiment of the retaining means which is inserted through an aperture in the cargo liner side wall.
Figure 9:
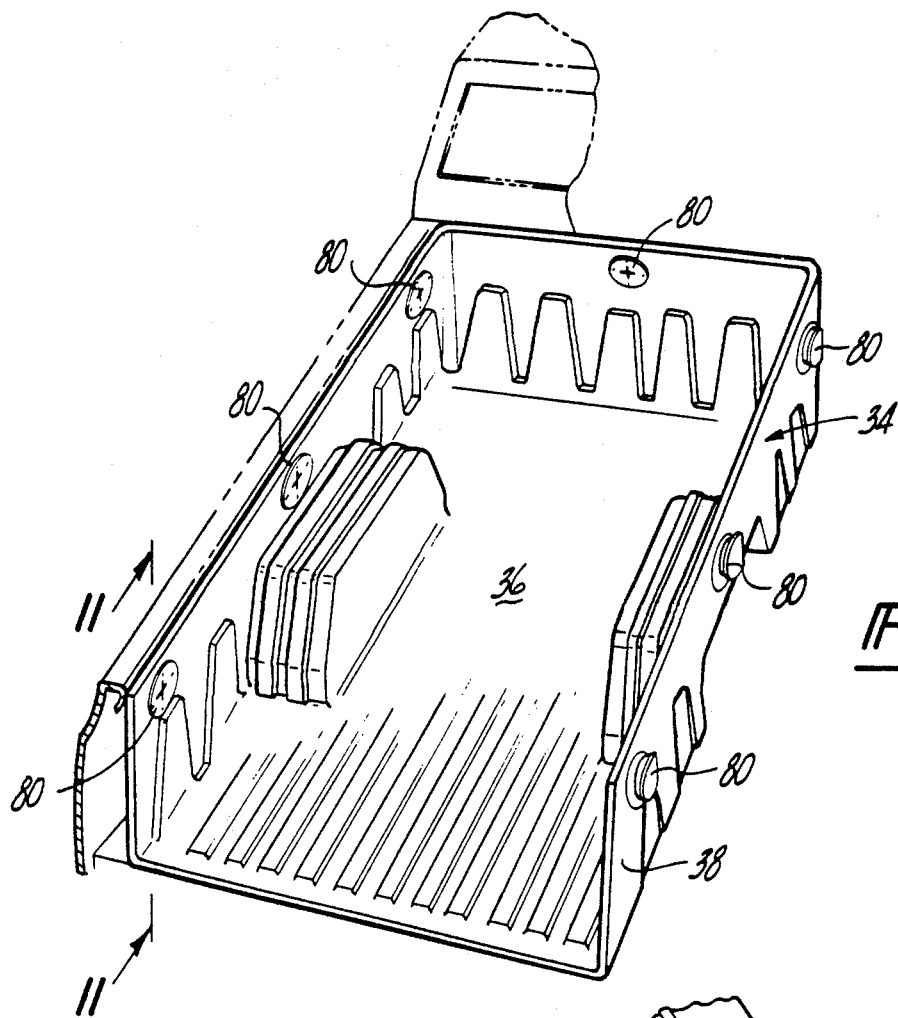
FIG. 9 is a fragmentary perspective view of a pick-up truck illustrating the cargo liner and retaining plugs of another embodiment.
Figure 10:
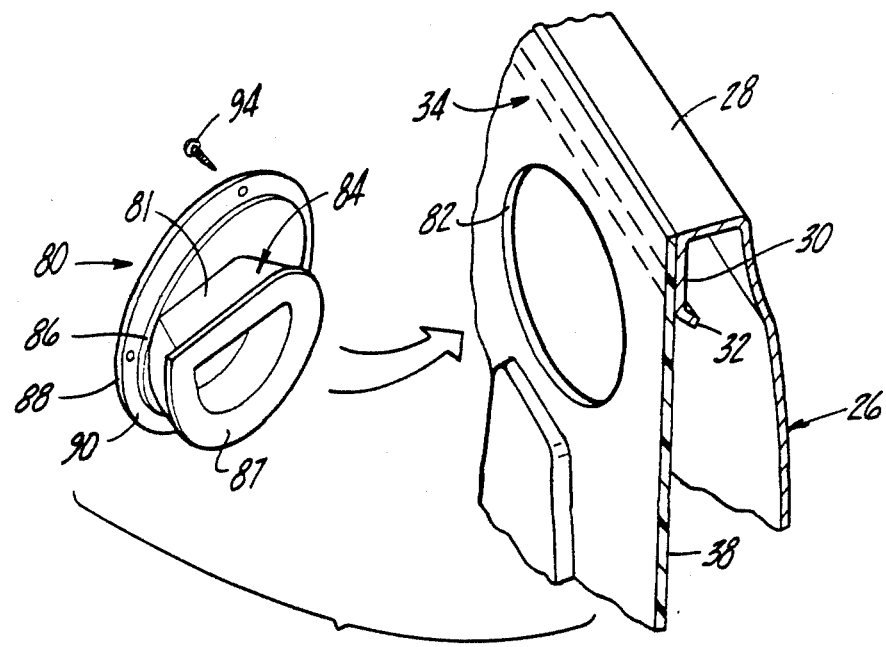
FIG. 10 is a fragmentary perspective assembly view of the preferred retaining plug which is inserted through a circular opening in the cargo liner side wall.

A plurality of liner retaining means 42 are inserted into corresponding retaining apertures 44 formed in liner walls 38 and 40. Each liner retaining means 42 includes a cup-shaped insertable portion 46 having an outwardly extending rim 48 around the periphery of the open end of the insertable portion 46. As shown in FIG. 2, the cup-shaped insertable portion 46 includes four sides connected by a bottom wall to form a box-like structure with a closed end and an open end. A series of adjustment openings 50 are located on one of the sides of portion 46 for receiving a fastener 52. Further, an alignment channel 54 is formed between rim 48 and leg 56 along one side of retaining means 42.

To secure the cargo liner 34 into the truck bed 24, each retaining means 42 is inserted into a corresponding aperture 44 in liner 34. As shown in FIG. 2, the alignment channel 54 is used to align insertable portion 46 and to hold retaining means 42 in aperture 44 until fastener 52 can be secured.

Referring now to FIGS. 3 and 4, fastener 52 is inserted into one of the adjustment openings 50 for engagement against lip 32 thereby securing rim 48 against liner side wall 38. In this manner, the cargo liner 34 is quickly and conveniently secured within truck bed compartment 24 without the need for drilling openings in bed 24 or otherwise disturbing its integrity. Further, since liner 34 does not have a top flange, the top rail 28 of truck bed 24 is unobstructed thereby permitting a camper top or cover to be secured thereto.

FIGS. 5 and 6 illustrate a modified retaining means 42 wherein the insertable cup portion 46 is generally triangular in cross-section which permits easier access with a tool to fastener 52 during the installation procedure as previously described. As shown in FIG. 5, the alignment channel formed between rim 48 and leg 56 may be located along the bottom edge when the insertable portion 46 is triangular in cross-section.

Referring now to FIGS. 7 and 8, a J-shaped retaining means 60 is disclosed including an adhesive material 62 covering the long leg 64 of the retainer 60. During installation, the short leg 66 of retainer 60 is clipped onto the upper edge of the liner side wall 38 and the cover strip 68 on adhesive material 62 is removed. Then, the adhesive material 62 is brought into engagement with ledge wall 30 for securing the J-shaped retainer clip 60 and attached liner side wall 38 to the truck bed 24.

FIGS. 9–14 illustrate further retaining means in the form of retaining plugs 80 that are inserted into circular openings 82. Each retaining plug 80 includes an insertable member 84 having an end plate 87 on one end and its other end affixed to a support disk 86 which is affixed to the back of a face plate 88. A rim portion 90 is provided between the edge of plate 88 and disk 86 for abutting liner 38.

Figure 11:
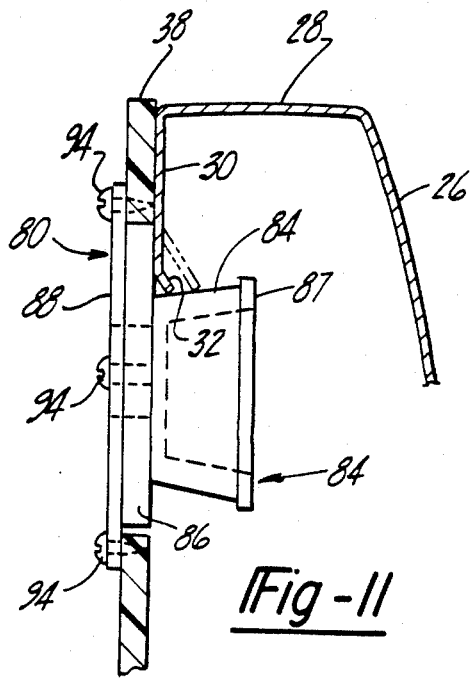
FIG. 11 is a cross-sectional view taken along line 11—11 in FIG. 9.
Figure 12:
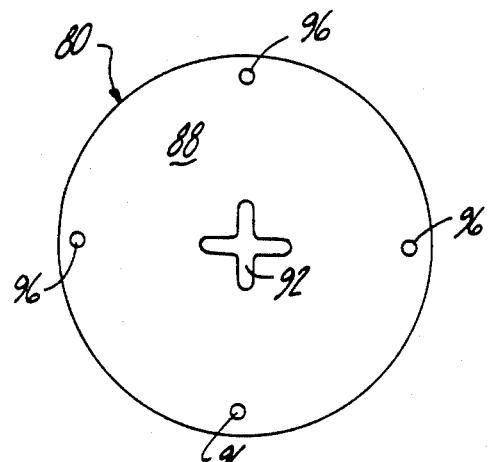
FIG. 12 is a plan view of the face plate.
Figure 13:
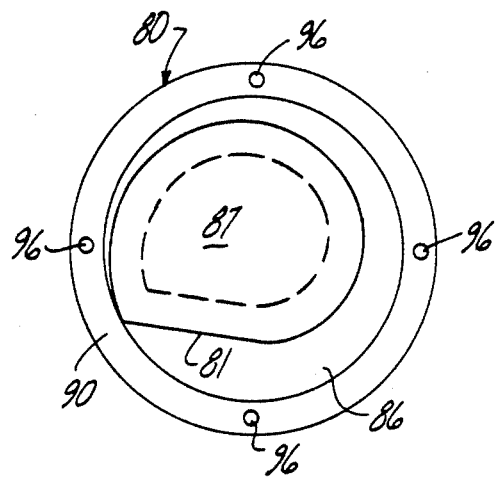
FIG. 13 is a plan view of the retaner plug as viewed from the rear.

With reference to FIGS. 11 and 13, insertable member 84 is substantially a truncated cone having a spiral shaped cross-section with the base of the cone having the smallest diameter. Due to its shape, insertable member 84 radially increases in size as plug 80 is rotated through approximately 180°. Upon rotation, insertable member 84 interacts with lip 32 in a screw-like manner pulling rim portion 90 tightly against liner 38 and wedging the side of the insertable member 84 against lip 32.

To prevent plug 80 from being overtightened, which could damage the protective liner, side 81 of insertable member 84 is straight. When plug 80 has been rotated more than approximately 180° side 81 is reached releasing insertable member 84 from engagement with lip 32.

In operation, a retainer plug 80 is inserted into an opening 82 positioned in the proper direction. With rim portion 90 pressed against liner 38, plug 80 is rotated approximately 180° until the widest portion of member 84 extends upwardly. Support disk 86 supports plug 80 within opening 82 as it is rotated. Screws 94 are then screwed into liner 38 through holes 96 to prevent plug 80 from loosening. A socket 92 is provided in the front of plate 88 for a screw driver to aid in its rotation. As illustrated in FIG. 11, the cone shape permits plug 80 to be used on any type truck since lip 32 is always adjacent the side of an insertable member 84.

Figure 14:
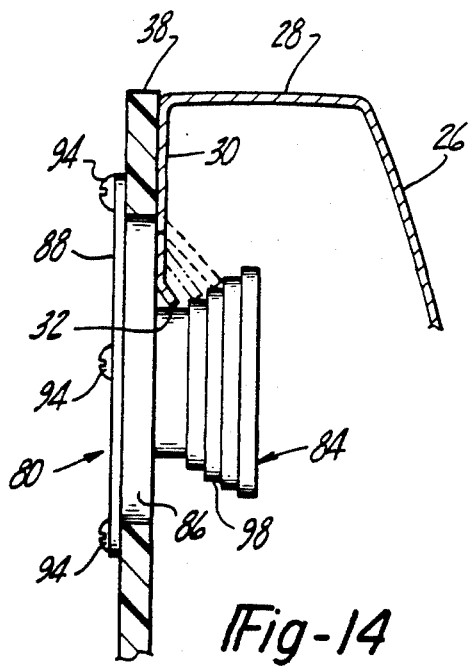
FIG. 14 is a cross-sectional view similar to FIG. 11 but showing a stepped insertable member.

With reference to FIG. 14, a modified form of retaining plug 80 is illustrated having stepped conical sides 98. Each stepped side 98 corresponds to a lip 32 which may be encountered in different types of pick-up trucks and provides additional engagement between insertable member 84 and lip 32 along the floor and wall of the respective stepped side 98.

It will be apparent to those skilled in the art that the foregoing disclosure is exemplary in nature rather than limiting, the invention being limited only by the appended claims.

I claim:

1. A retainer for securing a protective liner within a truck bed compartment having a top rail and a downwardly extending ledge from the top rail, said retainer including an insertable portion which is inserted through an opening in the liner and a rim portion which engages the liner at said opening, said insertable portion having a plurality of adjustment openings and a fastener extending through one of said adjustment openings for engagement with said ledge thereby securing said liner to said truck bed compartment;

the insertable portion includes side walls and a leg extending from one of said side walls, said leg being spaced from and generally parallel to said rim portion for forming an alignment channel;

the insertable portion side walls connected by a bottom wall to form a box-like structure with a closed end and an open end and said adjustment opening being located in one of the side walls of the insertable portion along a line that is angularly disposed with respect to said rim portion.

* * * * *